(12) United States Patent
Min et al.

(10) Patent No.: US 8,630,048 B2
(45) Date of Patent: Jan. 14, 2014

(54) MOTOR FOR DRIVING LENS

(75) Inventors: Sangjun Min, Seoul (KR); Soojin Jung, Seoul (KR); Taejin Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/202,037

(22) PCT Filed: Feb. 17, 2010

(86) PCT No.: PCT/KR2010/000985
§ 371 (c)(1),
(2), (4) Date: Aug. 17, 2011

(87) PCT Pub. No.: WO2010/095853
PCT Pub. Date: Aug. 26, 2010

(65) Prior Publication Data
US 2011/0310501 A1 Dec. 22, 2011

(30) Foreign Application Priority Data

Feb. 17, 2009 (KR) ........................ 10-2009-0012860
Mar. 23, 2009 (KR) ........................ 10-2009-0024430

(51) Int. Cl.
*G02B 7/02* (2006.01)
(52) U.S. Cl.
USPC ............................ 359/824; 359/822; 359/823
(58) Field of Classification Search
USPC .......................... 359/694, 696–698, 822–824
See application file for complete search history.

(56) References Cited

U.S. PATENT DOCUMENTS

| 2006/0138873 A1 | 6/2006 | Yasuda | |
| 2008/0231974 A1* | 9/2008 | Jung | 359/824 |
| 2008/0247063 A1 | 10/2008 | Otsuki et al. | |
| 2009/0141373 A1 | 6/2009 | Tang | |
| 2010/0271717 A1* | 10/2010 | Sue et al. | 359/824 |
| 2011/0310501 A1 | 12/2011 | Min et al. | |
| 2013/0038955 A1 | 2/2013 | Jung | |

FOREIGN PATENT DOCUMENTS

| CN | 101107769 A | 1/2008 |
| CN | 201096947 Y | 8/2008 |
| JP | 2005-128405 A | 5/2005 |
| JP | 2006-178291 A | 7/2006 |
| JP | 2008-268476 A | 11/2008 |
| KR | 10-2007-0075459 A | 7/2007 |
| KR | 10-2007-0078540 A | 8/2007 |
| KR | 10-2007-0091479 A | 9/2007 |
| KR | 10-2007-0109547 A | 11/2007 |
| KR | 10-2008-0046818 A | 5/2008 |
| KR | 10-2009-0026480 A | 3/2009 |
| KR | 10-2010-0106013 A | 10/2010 |
| WO | WO 2007064140 A1 * | 6/2007 |

OTHER PUBLICATIONS

International Search Report in International Application No. PCT/KR2010/000985, filed Feb. 17, 2010.
Office Action dated Mar. 18, 2013 in Chinese Application No. 201080008128.2, filed Feb. 17, 2010.
Office Action dated Nov. 14, 2013 in Chinese Application No. 201080008128.2, filed Feb. 17, 2010.

* cited by examiner

*Primary Examiner* — Mahidere Sahle
(74) *Attorney, Agent, or Firm* — Saliwanchik, Lloyd & Eisenschenk

(57) ABSTRACT

A motor for driving a lens is disclosed, wherein through holes through which a carrier passes are formed at an inner surface of a spring buried by an outer surface of the carrier, whereby the spring is not disengaged from the carrier to improve the reliability of the product.

11 Claims, 7 Drawing Sheets

MOTOR FOR DRIVING LENS

CROSS-REFERENCE TO RELATED APPLICATIONS

This application is the U.S. national stage application of International Patent Application No. PCT/KR2010/000985, filed Feb. 17, 2010, which claims priority to Korean Application Nos. 10-2009-0012860, filed Feb. 17, 2009, and 10-2009-0024430, filed Mar. 23, 2009, the disclosures of each of which are incorporated herein by reference in their entirety.

TECHNICAL FIELD

The present invention relates to a motor for driving a lens.

BACKGROUND ART

Concomitant with a recent trend toward multifunctional digital devices, a digital device embedded with a camera and an MP3 player has been developed and used. Further, a camera lens embedded in the digital device is automatically moved and adjusted by a motor for driving a lens (hereinafter referred to as "lens-driving motor").

The lens-driving motor has a base and a housing, each coupled together. The housing is disposed therein with a liftable carrier supported by a spring, and the carrier is disposed at an inner surface thereof with a lens.

The lens is screwed to the carrier. That is, the inner surface of the carrier and a periphery of the lens are correspondingly formed with a screw line, whereby the lens is inserted into the carrier and rotated thereinside to allow the lens to be coupled to the carrier.

In a case the lens is inserted into the carrier and rotated thereinside, the carrier is also rotated by torque. In a case the carrier is rotated for more than a predetermined angle, the spring experiences the plastic deformation, rendering the carrier to function in an unsatisfactory way.

However, there is a disadvantage in the conventional lens-driving motor in that there is no means for preventing the carrier from rotating for more than a predetermined angle, resulting in degraded reliability due to the plastic deformation of the spring.

Meanwhile, an attempt is required to slim and miniaturize the lens-driving motor by integrally forming the carrier and the spring to shorten the assembly process, and to constantly maintain an initially coupled status between the carrier and the spring lest the carrier and the spring should be easily separated or deformed.

DISCLOSURE OF INVENTION

Technical Problem

The present invention is disclosed to obviate the above-mentioned problems, and it is an object of the present invention to provide a lens-driving motor configured to prevent a spring from experiencing the plastic deformation caused by an assembly torque during assembly between a lens and a carrier. Another object is to provide a lens-driving motor configured to simplify and improve an assembled structure between the carrier and the spring and to constantly maintain an initial status lest a coupled structure between the carrier and the spring should be easily destructed.

Solution to Problem

In one general aspect of the present invention, there is provided a lens-driving motor, comprising: a base; a housing coupled at one surface to the base; a carrier liftably mounted at an inner surface of the housing, and coupled with a lens at an inner surface to allow being supported by the housing for prevention of rotation; and a spring coupled at an inner surface to the carrier, and supported by the housing side at an outer surface to pull down the lifted carrier and to return the carrier to an original status.

In another general aspect of the present invention, there is provided a lens-driving motor, comprising: a base; a housing coupled to the base; a carrier liftably mounted at an inner surface of the housing and housed with a lens; and a spring fixedly supported at an outer surface by the housing side, and coupled at an inner surface to an outer surface of the carrier to resiliently support the carrier, wherein the inner surface side of the spring is formed with a plurality of through holes through which the carrier passes.

Advantageous Effects of Invention

The lens-driving motor according to the present invention is advantageous in that one side of an outer surface of a carrier is supportively inserted into a yoke fixed at a housing to prevent the carrier from rotating at a predetermined angle or more, whereby a spring supporting the carrier is not rotated at a predetermined angle or more either, and the spring is deformed only within a scope of elastic limit to allow the spring to properly function at all times to an enhanced reliability of the product.

The lens-driving motor according to the present invention is further advantageous in that through holes through which the carrier passes are formed at an inner surface of the spring buried in a periphery of the carrier, whereby the spring is prevented from being disengaged from the carrier to an enhanced reliability of the product.

BEST MODE FOR CARRYING OUT THE INVENTION

A lens-driving motor according to exemplary embodiments of the present invention will be described in detail with reference to the accompanying drawings.

Figure 1:
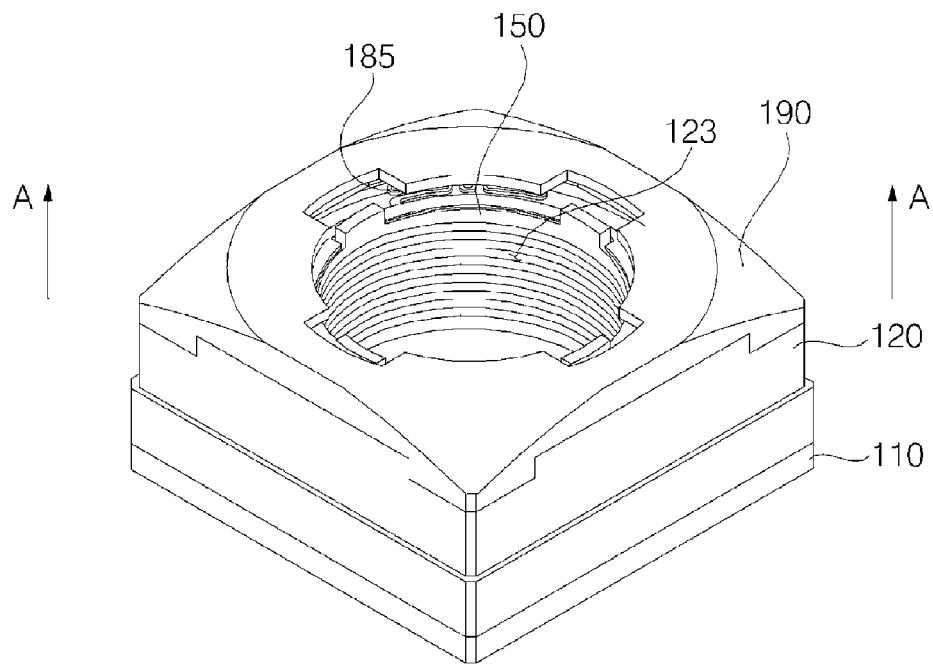
FIG. 1 is a perspective view of a lens-driving motor according to an exemplary embodiment of the present invention.
Figure 2:
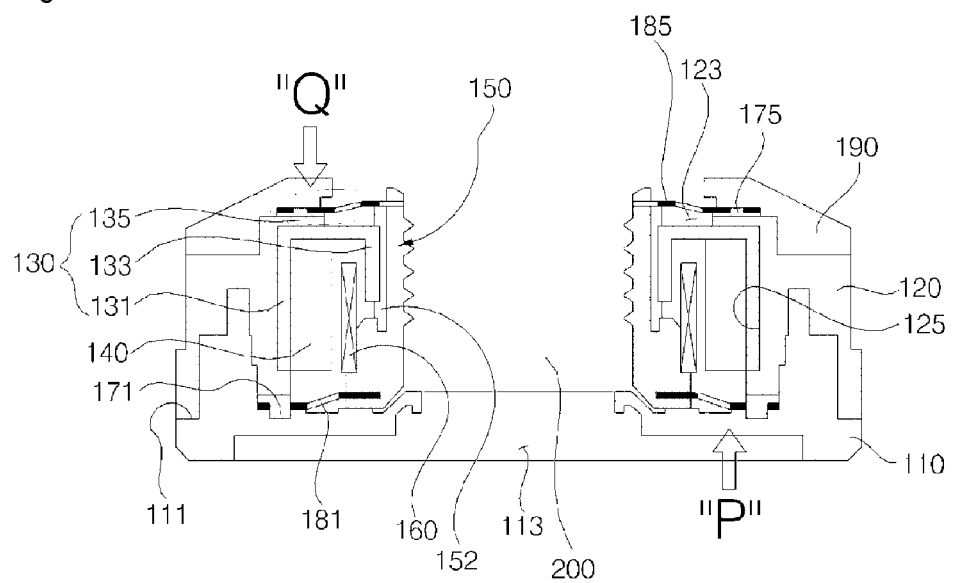
FIG. 2 is a cross-sectional view along line "A-A" of FIG. 1.
Figure 3:
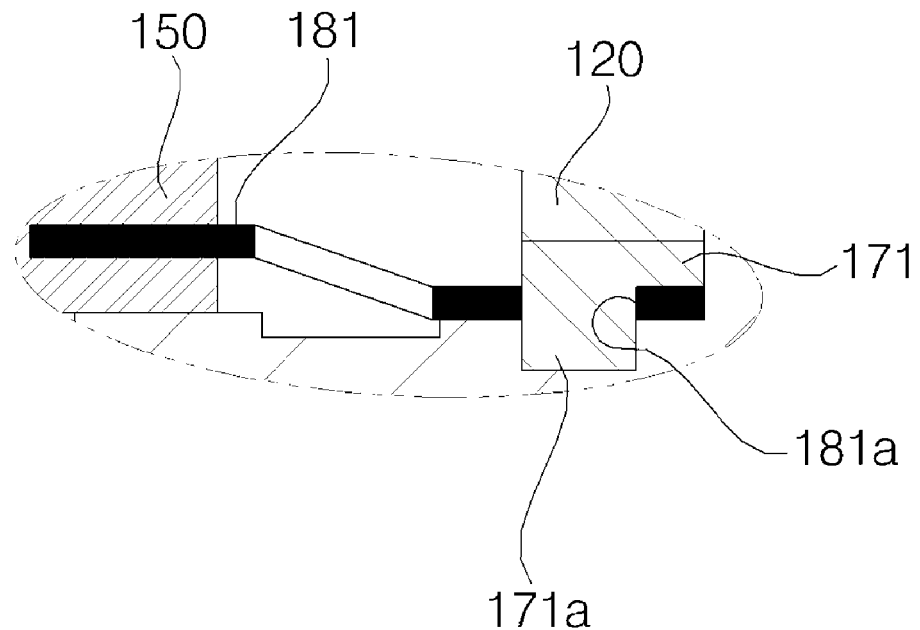
FIGS. 3 and 4 are enlarged views of a "P" part and a "Q" part of FIG. 2.
Figure 4:
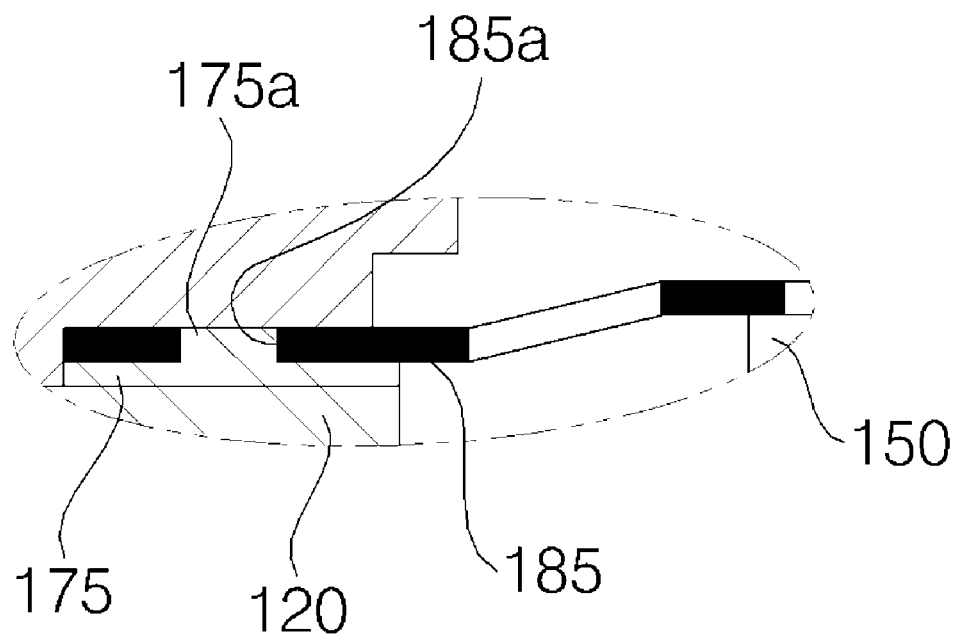

FIG. 1 is a perspective view of a lens-driving motor according to an exemplary embodiment of the present invention, FIG. 2 is a cross-sectional view along line "A-A" of FIG. 1, and FIGS. 3 and 4 are enlarged views of a "P" part and a "Q" part of FIG. 2.

As illustrated, a lens-driving motor according to the present invention includes a base (110) and a housing (120)

each coupled together to form an inner space therebetween. In designating a direction and a surface of constituent parts including the base (110), a direction and a surface facing an upper vertical side of the base (110) are respectively called "an upper side" and "an upper surface", while a direction and a surface facing a bottom vertical side of the base are respectively called "a bottom side" and "a bottom surface".

The housing (120) is coupled at a bottom surface to the base (110). An edge of the base (110) is formed with a stair (111) into which a bottom surface of the housing is inserted, whereby foreign objects are prevented from entering a coupled part between the base (110) and the housing (120). An upper surface of the base (110) and the housing (120) is formed with a through hole (113) and an inlet/outlet hole (123) each facing the other.

A yoke (130) is formed at an inner surface of the housing (120). Meanwhile, it should be apparent that the housing (120) may be coupled with the yoke (130), or the housing itself may be a yoke. The yoke (130) may include a square frame-shaped outer wall (131), an ring-shaped inner wall (133) formed inside the outer wall (131), and a connection plate (135) connected to an upper end surface of the outer wall (131) and to an upper end surface of the inner wall (133) to integrally connect the outer wall (131) and the inner wall (133).

The outer wall (131) of the yoke (130) and the connection plate (135) are wrapped by the housing (120) to form an integrated shape. At this time, an accommodation groove (125) is formed at an inner surface of the housing (120) for the outer wall (131) of the yoke (130) to be inserted and accommodated therein, whereby the yoke (130) is integrally and securely formed with the housing (120).

An inner surface of an edge side of the outer wall (131) on the yoke (130) is disposed with a magnet (140), and an inner side of the inner wall (133) on the yoke (130) is liftably mounted with a carrier (150) to allow entering an inlet/outlet hole (123). A lens (200) is mounted at an inner surface of a carrier (150) and a coil (160) is wound on a periphery of the carrier (150).

The coil (160) is oppositely formed from the magnet (140), and in a case a current flows in the coil (160), the coil (160) is lifted by an electromagnetic force formed between the coil (160) and the magnet (140), which in turn raises the carrier (150) to lift the lens (200). The housing (120) is integrally formed with a ring-shaped resilient spacer for compensating a dimensional tolerance of parts and an assembly tolerance generated in the course of assembling the parts. The spacer includes first and second spacers (171, 175) integrally and respectively formed at a bottom end surface and an upper end surface of the housing (120).

The housing is formed by injection molding, and the yoke (130) and the spacer are integrally formed during injection molding of the housing (120).

The carrier (150) lifted by the electromagnetic force is lowered by a spring including first and second springs (181, 185) to return to its original status.

To be more specific, an inner surface of the first spring (181) is integrally formed with an outer surface of bottom side of the carrier (150), and an outer surface of the first spring (181) is inserted into the base (110) and the first spacer (171) to be supported thereat. An inner surface of the second spring (185) is coupled to an upper outer surface of the carrier (150), and an outer surface of the second spring (185) is inserted into a cover (190) coupled to an upper surface of the housing (120) and the second spacer (175) to be supported thereat.

In a case a current flows in the coil (160) to lift the carrier (150), the first and second springs (181, 185) are elastically deformed, and in a case the current is stopped from the coil (160), the carrier (150) returns to an initial status by the elasticity of the first and second springs (181, 185).

Coupling holes (181a, 185a) and coupling protrusions (171a, 175a) are formed, each facing the other and the protrusions being inserted into the coupling holes, at an outer surface of the first and second springs (181, 185) and the first and second spacers (171, 175). The cover (190) is mounted on an upper surface of the housing (120) to cover the second spacer (175) and to prevent foreign objects from entering the coupled part between the base and the housing.

Screw threads are formed on an inner surface of the carrier (150) and an outer surface of the lens (200), each corresponding to the other, where the lens (200) is screwed to the carrier (150). That is, the lens (200) is inserted into and rotated in the carrier (150) to couple the lens (200) with the carrier (150), whereby the carrier (150) can be rotated by torque. In a case the carrier (150) is rotated at a predetermined angle or more, the first and second springs (181, 185) experience the plastic deformation to create a problem of not performing a proper function.

Figure 5:
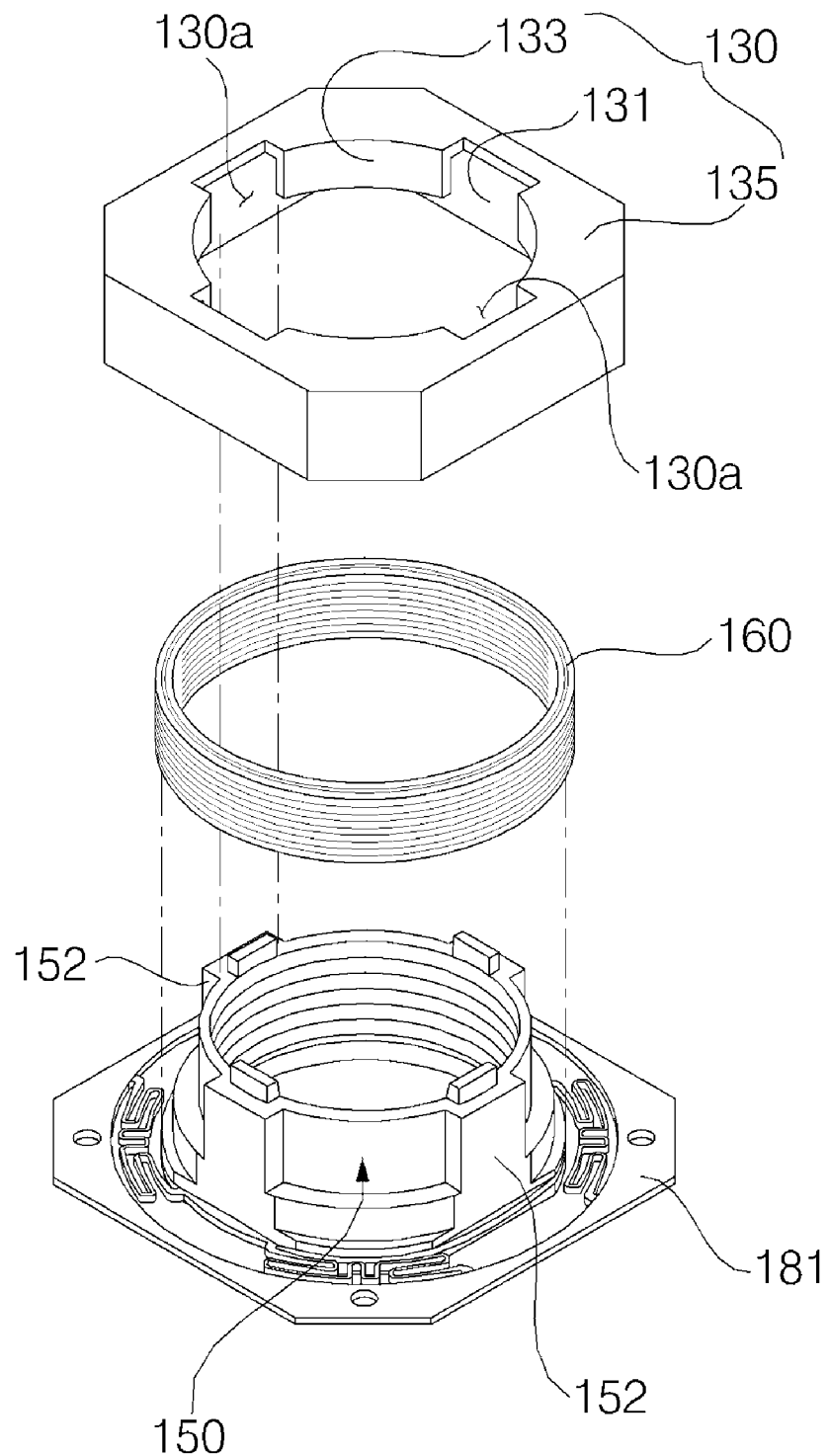
FIG. 5 is an exploded perspective view of an essential part of FIG. 1.

The lens-driving motor according to the present invention prevents the carrier (150) from rotating at a predetermined angle or more by supporting the carrier (150) to the yoke (130), the operation of which will be described with reference to FIGS. 2 and 5. FIG. 5 is an exploded perspective view of an essential part of FIG. 1.

As shown in the figures, the carrier (150) is protrusively formed at an outer surface with a plurality of hitching rails (152) in parallel with a motional direction of the carrier (150), and an opening groove (130a) is formed at the yoke (130) fixed at the housing (120) or at an inner surface of the housing (120), where the hitching rails (152) are insertedly hitched by the opening groove (130a), and the opening groove (130a) and the hitching rails (152) are formed in parallel with the motional direction of the carrier (150).

In this case, even if the carrier is rotated by the torque generated in the course of the lens (200) being coupled to the carrier (150), the hitching rails (152) are hitched at the housing or the yoke forming the opening groove (130a) to prevent the carrier (150) from rotating at a predetermined angle or more.

The opening groove (130a) is formed at a portion where the connection plate (135) contacting the inner wall (133) and the inner wall (133) of the yoke (130) are joined.

Mode For The Invention

Now, as an improvement to the aforementioned exemplary embodiment, an exemplary embodiment configured to reduce an assembly process by integrally forming a carrier and a spring, and an exemplary embodiment configured to constantly maintain an initial status by preventing the carrier and the spring from being easily separated or deformed will be described.

Figure 6:
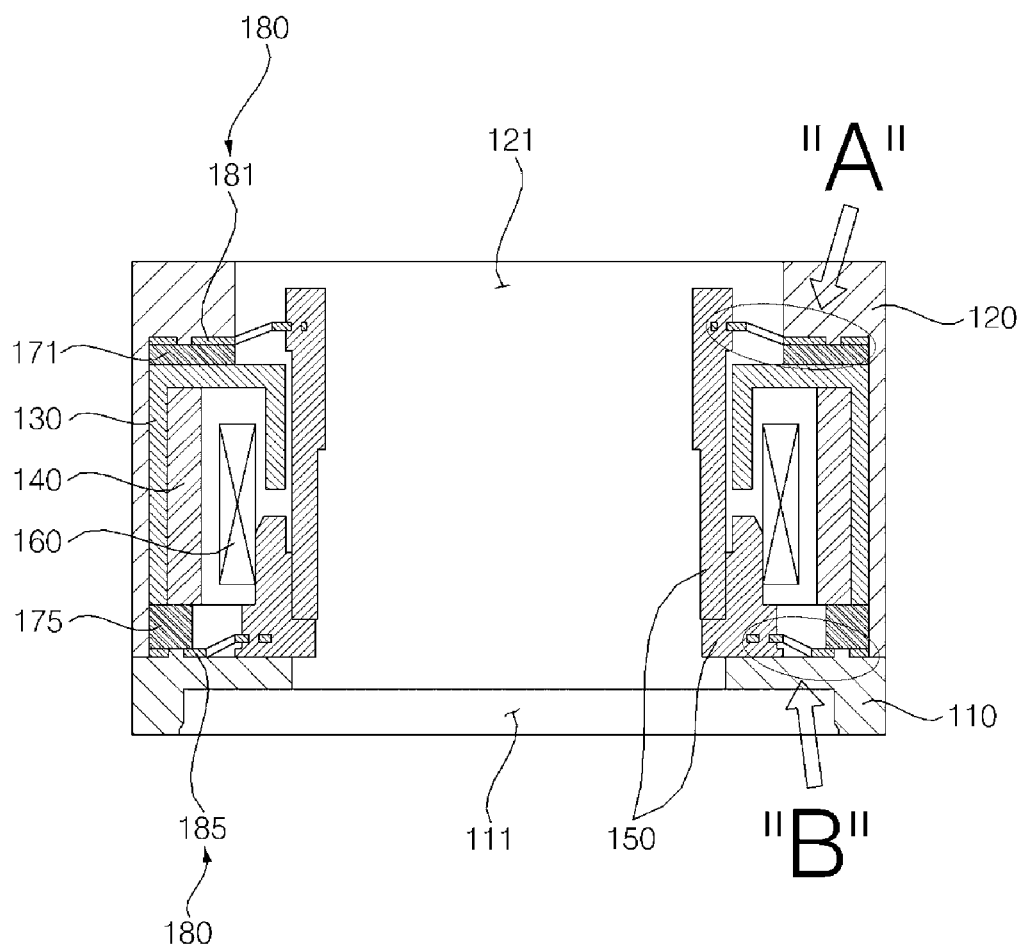
FIG. 6 is a cross-sectional view of a lens-driving motor according to an exemplary embodiment of the present invention.
Figure 7:
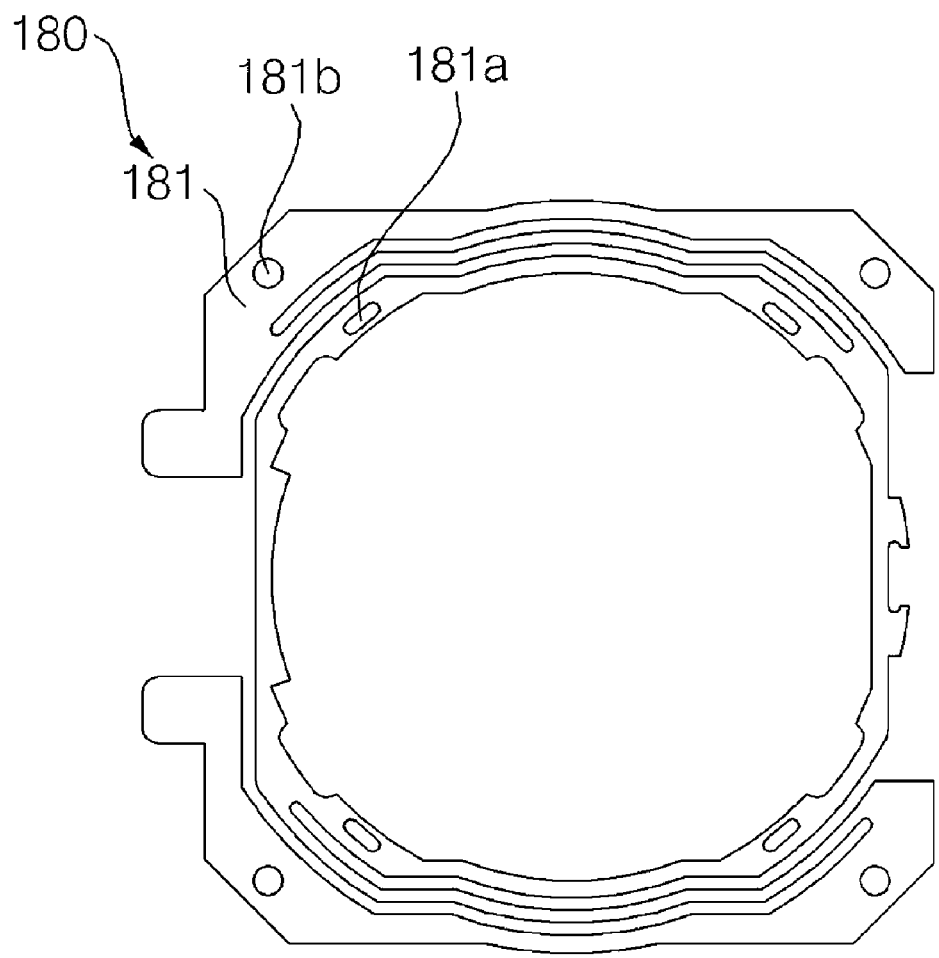
FIG. 7 is a plan of a spring illustrated in FIG. 6.
Figure 8:
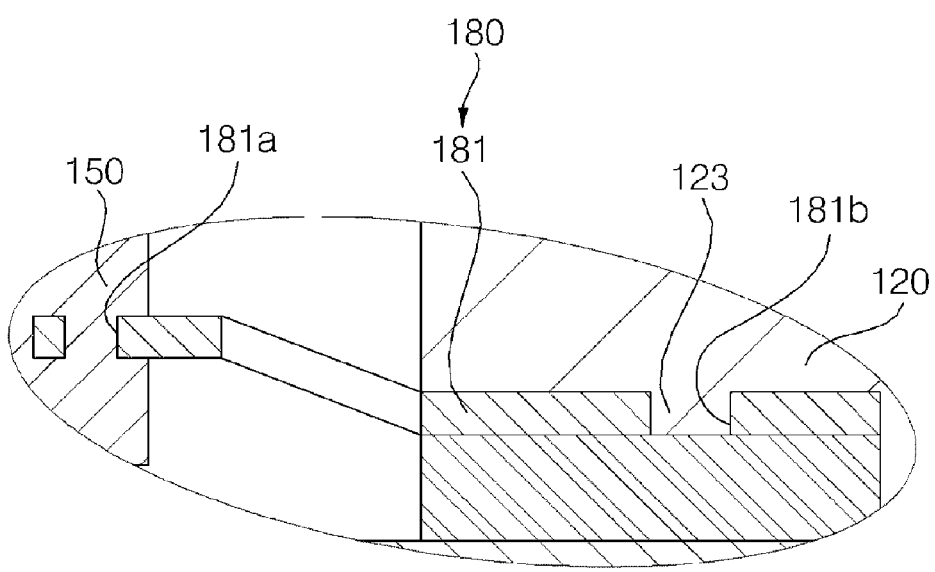
FIGS. 8 and 9 are enlarged views of a "A" part and a "B" part of FIG. 6.
Figure 9:
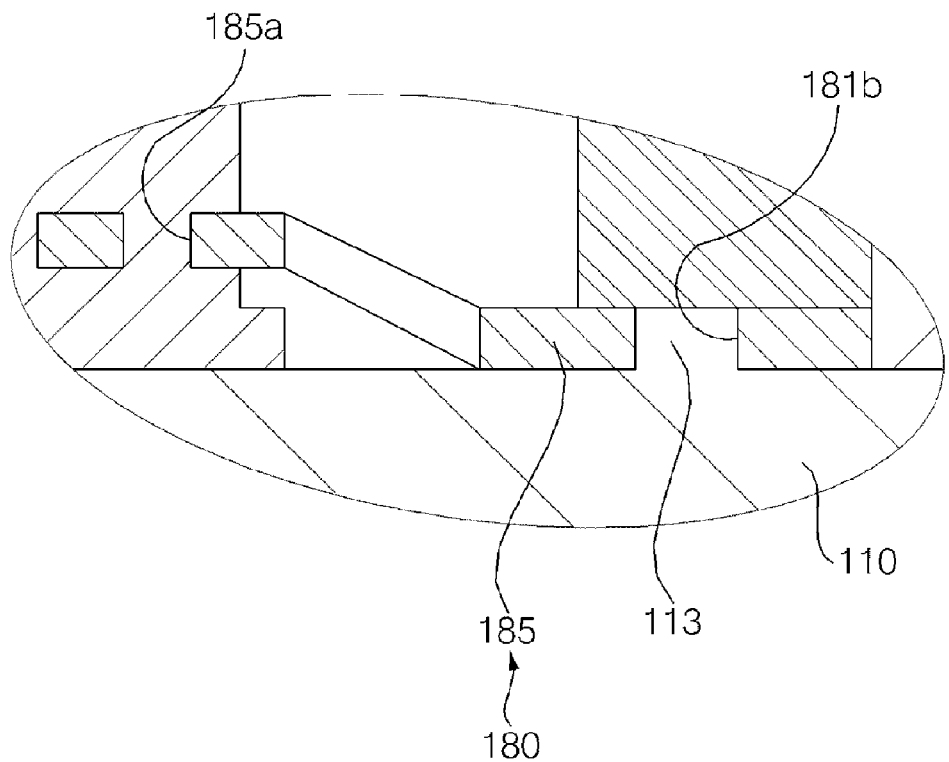
Figure 10:
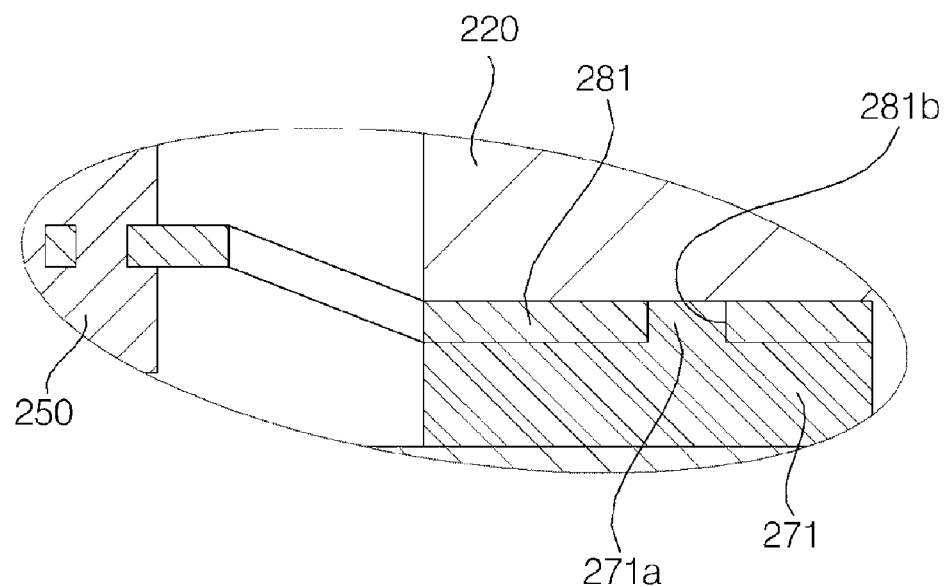
FIGS. 10 and 11 are enlarged views of an essential part in a lens-driving motor according to another exemplary embodiment of the present invention.
Figure 11:
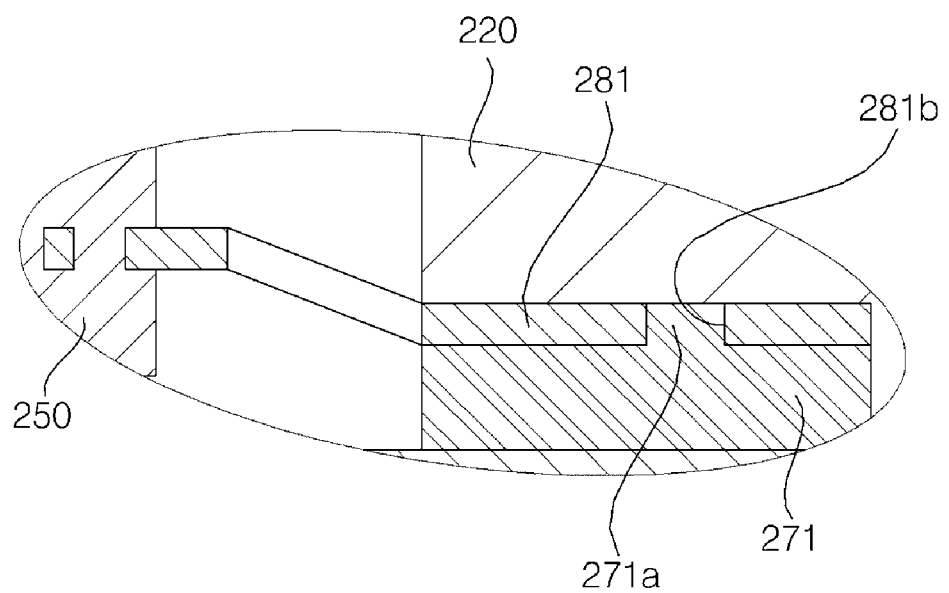

FIG. 6 is a cross-sectional view of a lens-driving motor according to an exemplary embodiment of the present invention, FIG. 7 is a plan of a spring illustrated in FIG. 6, FIGS. 8 and 9 are enlarged views of a "A" part and a "B" part of FIG. 6 and FIGS. 10 and 11 are enlarged views of an essential part in a lens-driving motor according to another exemplary embodiment of the present invention.

Referring to FIGS. 6 to 11, a ring-shaped spring (180) is mounted at upper and bottom sides of the yoke (130). The carrier (150) lifted by operations of the coil (160) and the magnet (140) returns to its original shape by the elasticity of the spring (180) if a current is stopped from flowing in the coil (160). The spring (180) includes a plurality of springs each having a different diameter that form a concentricity. The spring (180) may include a first spring (181) mounted at an upper side of the first spacer (171) and a second spring (185) mounted at a bottom surface of the second spacer (175).

To be more specific, an inner surface of the first spring (181) is integrally formed with an outer surface of upper side of the carrier (150), and an outer surface of the first spring (181) is inserted into the housing (120) and the first spacer (171) to be supported thereat. An inner surface of the second spring (185) is coupled to a bottom outer surface of the carrier (150), and an outer surface of the second spring (185) is inserted into the base (110) and the second spacer (175) to be supported thereat. The first and second springs (181, 185) are configured in the same shape and same construction but may differ in diameters thereof according to positions coupled to the carrier (150).

In order to simplify an assembled structure, the carrier (150) is injection molded, and the spring (180) is integrally formed by an insert injection molding method in which an inner side of the spring (180) is buried in an outer surface of the carrier (150) during injection of the carrier (150).

Meanwhile, an area of an inner circumferential surface of the spring (180) that is buried by the outer surface of the carrier (150) tends to grow small due to slimness and miniaturization of the lens-driving motor, which may spawn the fear of disengaging the inner circumferential surface of the spring (180) from the carrier (150).

The lens-driving motor according to the present invention is configured to prevent the spring (180) from disengaging from the carrier (150), the operation of which will be described with reference to FIGS. 8 and 9. FIGS. 8 and 9 are enlarged views of a "A" part and a "B" part of FIG. 6.

Referring to FIGS. 8 and 9, an inner circumferential surface of the first and second springs (181, 185) that are buried in the outer surface of the carrier (150) are formed with a plurality of through holes (181a, 185a), whereby an inner surface at the outer surface of the carrier (150) passes the through holes (181a, 185a) to be integrally formed with the first and second springs (181, 185), such that the first and second springs (181, 185) are prevented from being disengaged from the carrier (150).

The lens-driving motor according to the present invention is configured in such a manner that a plurality of support holes (181b, 185b) are formed at an outer surface side of the first and second springs (181, 185), and the support protrusions (123, 113) that are inserted into the support holes (181b, 185b) are formed at the housing (120) and the base (110).

Then, the first and second springs (181, 185) are accurately coupled to preset portions of the housing (120) and the base (110) to prevent the first and second springs (181, 185) from rotating on the housing (120) and the base (110), whereby forces from the first and second springs (181, 185) are uniformly distributed on all areas of the carrier (150) to allow the carrier (150) to stably and accurately descend and ascend.

FIGS. 10 and 11 are enlarged views of an essential part in a lens-driving motor according to another exemplary embodiment of the present invention, where only the difference from that of FIGS. 8 and 9 will be described.

As illustrated, a plurality of support holes (281b, 285b) respectively formed at an outer surface side of first and second springs (281, 285) are respectively inserted by support protrusions (271a, 275a) formed at first and second spacers (271, 275). The first and second springs (281, 285) are accurately coupled to preset portions of a housing (220) and a base (210) to prevent the first and second springs (281, 285) from rotating on the housing (220) and the base (210), whereby forces from the first and second springs (281, 285) are uniformly distributed on all areas of a carrier (250) to allow the carrier (250) to stably and accurately descend and ascend.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The lens-driving motor according to the present invention has an industrial applicability in that one side of an outer surface of a carrier is supportively inserted into a yoke fixed at a housing to prevent the carrier from rotating at a predetermined angle or more, whereby a spring supporting the carrier is not rotated at a predetermined angle or more either, and the spring is deformed only within a scope of elastic limit to allow the spring to properly function at all times to an enhanced reliability of the product.

The lens-driving motor according to the present invention is further advantageous in that through holes through which the carrier passes are formed at an inner surface of the spring buried in a periphery of the carrier, whereby the spring is prevented from being disengaged from the carrier to an enhanced reliability of the product.

The invention claimed is:

1. A motor for driving a lens, comprising:
a base;
a housing coupled at one surface to the base;
a carrier liftably mounted at an inner surface of the housing, supported by the housing for prevention of rotation, and coupled with a lens at an inner surface; and
a spring coupled at an inner surface to the carrier, and supported by the housing side at an outer surface to pull down the lifted carrier and to return the carrier to an original status;
wherein one side and the other side of the housing are respectively formed with spacers for compensating dimensional tolerance and assembly tolerance of parts,
wherein the spring is provided in a pair, where an inner side of the pair of springs is coupled to the carrier while the outer portion of the springs is supported by the spacer,
wherein the outer portion of the spring comprises at least one coupling hole having a vertically-protruding coupling protrusion inserted therethrough to inhibit rotation of the spring,
wherein at least one of the base and the spacers is formed with said vertically-protruding coupling protrusions, and
wherein a height of the vertically-protruding coupling protrusions is subtstantially the same as a height of the outer portion of the spring such that the outer portion the spring directly contacts the base and at least one of the spacers.

2. The motor of claim 1, comprising a yoke fixedly coupled to an inner surface of the housing.

3. The motor of claim 1, wherein a hitching rail is formed at an outer surface of the carrier, an opening groove is formed at the housing or the yoke, and the hitching rail is inserted into the opening groove to be hitched thereat and the hitching rail and the opening groove are formed in parallel with the motion direction of the carrier.

4. The motor of claim 3, wherein the yoke includes a connection plate connecting an outer wall and an inner wall by being integrally formed at the outer wall fixed at the housing, the inner wall positioned at an inner side of the outer wall, a cross-section of the outer wall facing the other side of the housing and a cross-section of the inner wall, and the opening groove connectively formed at the inner wall and the connection plate.

5. The motor of claim 1, wherein the other side of the housing is coupled to a cover.

6. The motor of claim 1, comprising a magnet fixedly coupled to the inner surface of the housing.

7. A motor for driving a lens, comprising:
a base;
a housing coupled to the base;
a carrier liftably mounted at an inner surface of the housing and housed with a lens; and
a spring fixedly supported at an outer surface by the housing side, and coupled at an inner surface to an outer surface of the carrier to resiliently support the carrier,
wherein the inner surface side of the spring is formed with a plurality of through holes through which the carrier passes,
wherein a yoke is mounted inside the housing in the form of wrapping the carrier, the yoke is fixed by a magnet, and an outer surface of the carrier is mounted with a coil configured to lift the carrier in cooperation with the magnet,
wherein a first spacer and a second spacer are formed between one end of the yoke and the housing, and between the other end of the yoke and the base, and an outer portion side of the spring includes a first spring and a second spring between the first spacer and the housing, and between the second spacer and the base,
wherein an outer portion of the first and second springs is formed with at least one support hole,
wherein the first and second spacers are formed with at least one vertically-protruding support protrusion inserted into the at least one support hole of the first spring and the at least one support hole of the second spring, respectively, and
wherein a height of the vertically-protruding coupling protrusions is substantially the same as a height of the outer portion of the spring such that the outer portion of the spring directly contacts the base and at least one of the spacers.

8. The motor of claim 7, wherein the carrier is injection molded. and an inner circumferential surface of the spring formed with through holes is integrally formed by being buried in the outer surface of the carrier.

9. The motor of claim 7, wherein the outer surface side of the first and the second spring are respectively formed with a plurality of support holes, and the housing and the base are respectively formed with support protrusions inserted into the support hole of the first spring and the support hole of the second spring.

10. The motor of claim 2, wherein a hitching rail is formed at an outer surface of the carrier, an opening groove is formed at the housing or the yoke, and the hitching rail is inserted into the opening groove to be hitched thereat and the hitching rail and the opening groove are formed in parallel with the motion direction of the carrier.

11. The motor of claim 10, wherein the yoke includes a connection plate connecting an outer wall and an inner wall by being integrally formed at the outer wall fixed at the housing, the inner wall positioned at an inner side of the outer wall, a cross-section of the outer wall facing the other side of the housing and a cross-section of the inner wall, and the opening groove connectively formed at the inner wall and the connection plate.

* * * * *